Feb. 27, 1968   H. L. FIELDING   3,370,730
ARTICULATED VEHICLE
Filed Oct. 1, 1963   3 Sheets-Sheet 1

*INVENTOR.*
HARRY L. FIELDING
BY BUCKHORN, BLORE
KLARQUIST & SPARKMAN
ATTORNEYS

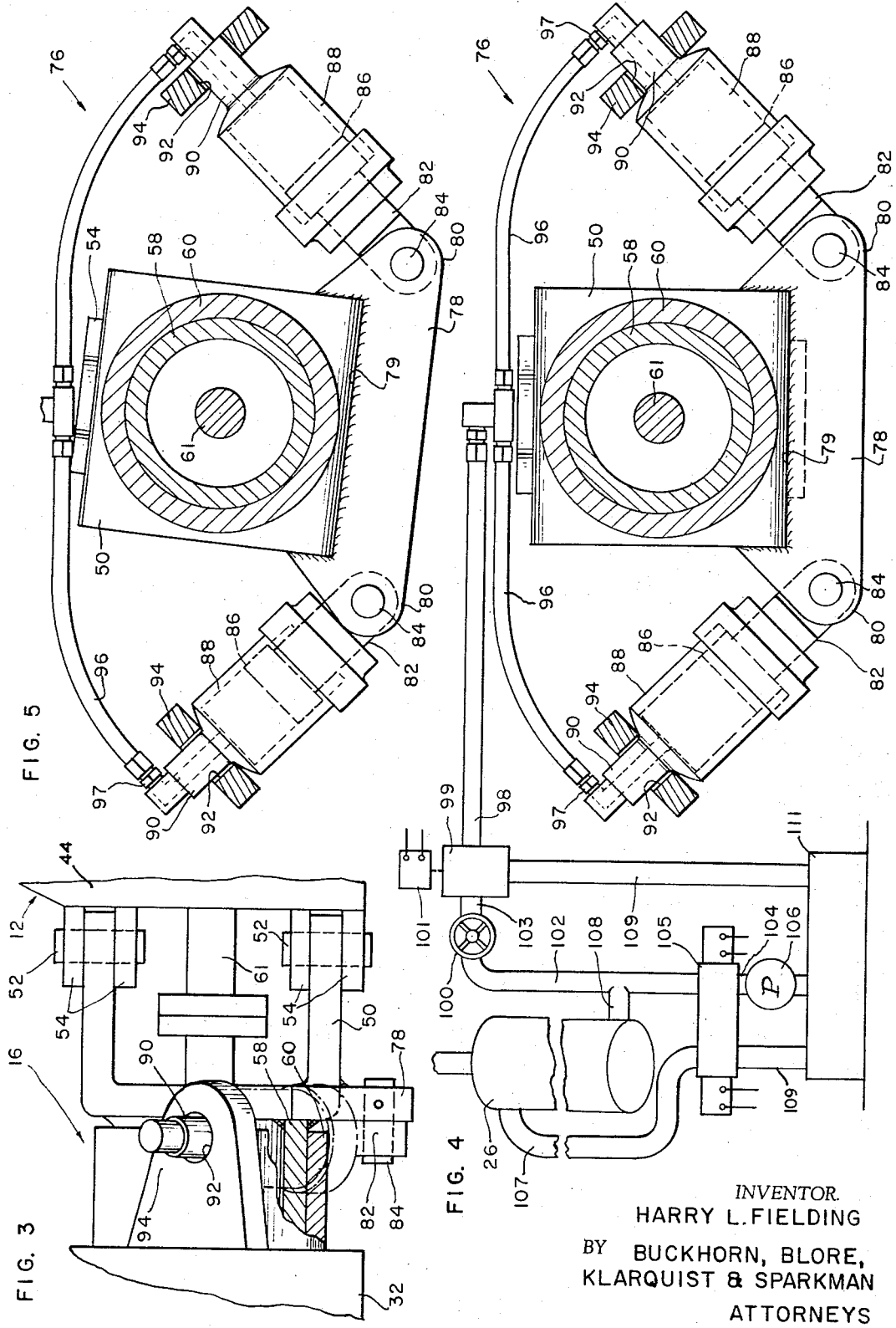

Feb. 27, 1968      H. L. FIELDING      3,370,730
ARTICULATED VEHICLE
Filed Oct. 1, 1963      3 Sheets-Sheet 3
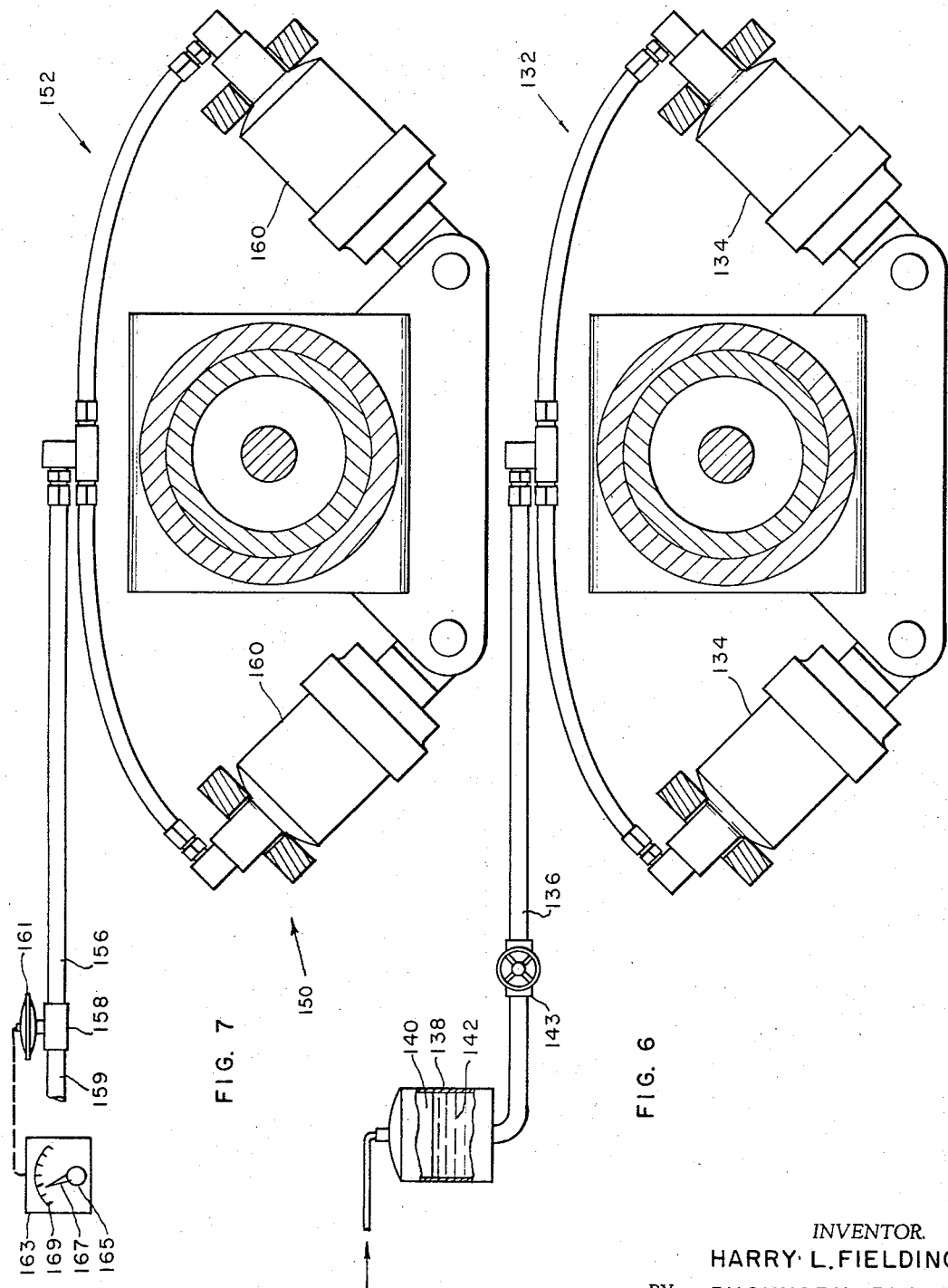
INVENTOR.
HARRY L. FIELDING
BY    BUCKHORN, BLORE,
KLARQUIST, & SPARKMAN
ATTORNEYS United States Patent Office 3,370,730
Patented Feb. 27, 1968

3,370,730
ARTICULATED VEHICLE
Harry L. Fielding, Portland, Oreg., assignor to Mixermobile Manufacturers, Inc., Portland, Oreg., a corporation of Oregon
Filed Oct. 1, 1963, Ser. No. 313,115
10 Claims. (Cl. 214—778)

This invention relates to articulated vehicles, and more particularly to articulated vehicles carrying outboard loads.

In an articulated vehicle such as, for example, a front end loader, tractor, logger, truck, pusher and the like in which there is provided an outboard load carrying device, a front frame and a rear frame, each carried by a set of wheels and in which the frames are pivotal relative to one another about a generally vertical pivot axis and in which one of the frames is pivotal about a horizontal pivot axis relative to the other frame to enable the vehicle to travel over rough terrain with all the wheels on the ground, the weight of the rear frame and mechanisms carried thereby counterbalances the outboard load carrying device which is mounted on the front frame. In such vehicles known hitherto, when the two frames are positioned angularly relative to each other and the frames are free to pivot about the horizontal pivot axis, the counterbalancing weight of the rear frame is not fully effective but rather transfers a substantial part of the counterbalancing weight to one of the wheels of the rear frame. As a result, the rear frame has had to be excessively heavy for the sole purpose of providing sufficient counterbalancing weight. This loss of the effectiveness of a substantial portion of the counterbalancing weight has necessitated increasing the total weight of the vehicle by as much as 20% or more greater than otherwise would be necessary. It would be desirable to provide articulated vehicles in which the counterbalancing load is not shifted to any great extent to one of the supporting wheels of the counterbalancing frame section when the frame sections are turned at substantial angles relative to one another.

An object of the invention is to provide new and improved articulated vehicles.

Another object of the invention is to provide new and improved articulated vehicles having outboard load carrying means.

Another object of the invention is to provide an outboard load carrying articulated vehicle having a load carrying section pivotal on a generally vertical pivot axis relative to a counterbalancing section and also pivotal about a generally horizontal pivot axis relative to the counterbalancing section together with a device for restraining pivotal movement of the load carrying section relative to the counterbalancing section about the horizontal axis so that the weight of the counterbalancing section is taken from both wheels of the counterbalancing section.

Another object of the invention is to provide an articulated vehicle of a type adapted to carry an outboard load which maintains an even load distribution on the tires under load.

Yet another object of the invention is to provide an articulated vehicle adapted to carry an outboard load which maintains stability regardless of any turned position of the vehicle.

A still further object of the invention is to provide an articulated vehicle of the type adapted to carry an outboard load which keeps positive traction on all of the wheels thereof.

The invention provides an articulated vehicle including an outboard load carrying front section and a counterbalancing rear section pivotal relative to the load carrying front section about a generally vertical pivot axis with the entire counterbalancing rear section thereof being pivotal about a generally horizontal pivot axis by a horizontal pivot connection. Means are provided for restraining such pivotal movement about the horizontal axis so that the counterbalancing weight is transferred to the load carrying section as needed. In an articulated vehicle forming a specific embodiment of the invention, a front section is attached to a rear section by a vertical pivot connection permitting pivotal movement between the sections about a substantially vertical pivot axis and by a horizontal pivot connection permitting horizontal pivotal movement between the sections about a substantially horizontal pivot axis corresponding to the longitudinal axis of one of the sections. Each of the front and rear sections includes a frame carried by a pair of wheels. A cross bar is fixed to the frame of the rear section against movement about the horizontal pivot axis relative to the rear section and extends transversely of the horizontal pivot axis. A pair of lugs are mounted on the frame of the front section on opposite sides of the horizontal pivot axis in positions substantially above the cross bar and facing the ends of the cross bar. A pair of hydraulic restraining cylinders having guide pins fixed thereto are mounted with the guide pins slidable in the bores in the lugs and with the ends of the cylinders abutting the lugs when the sections are not pivoted horizontally relative to each other. Piston rods mounted in the cylinders are pivotally connected to the ends of the cross bar and are urged away from the cylinders so that the pistons and cylinders restrain pivotal movement of the front section relative to the rear section about the horizontal pivot axis. The front section carries thereon a boom carrying a load carrying bucket in an outboard position relative to the wheels of the front section and an hydraulic hoist cylinder is provided for raising and lowering the boom and also to support a portion of the weight of the boom to keep the bucket in an elevated position while the vehicle is moved. The restraining cylinders are preferably connected to the hydraulic supply line to the hoist cylinder so that the resistance to the horizontal pivotal movement of the front section relative to the rear section is proportional to the load carried by the bucket. There also may be provided a shut off valve in the hydraulic line to the restraining cylinders to lock the two wheeled sections against pivotal movement relative to each other about the horizontal pivot axis. In a vehicle forming an alternate embodiment of the invention, the pressure on the restraining cylinders is effected by an accumulator to maintain constant pressure on the hydraulic fluid supplied to the restraining cylinders. In a vehicle forming an alternate embodiment of the invention, restraining cylinders are supplied with air under pressure variable by the operator of the vehicle, and in which there is provided a controller convenient to the operator of the vehicle which is adjusted manually to vary a pressure regulator to supply fluid to restraining cylinders under a pressure determined by the controller.

A complete understanding of the invention may be obtained from the following detailed description of articulated vehicles forming specific embodiments thereof, when read in conjunction with the appended drawings, in which:

FIG. 3 is an enlarged elevation view of the vehicle of FIG. 1 with portions thereof broken away;

FIG. 4 is an enlarged vertical sectional view taken substantially along line 4—4 of FIG. 2;

FIG. 5 is a view similar to FIG. 4 with parts thereof in different positions from those shown in FIG. 4;

FIG. 6 is a schematic view of a portion of an articulated vehicle forming an alternate embodiment of the invention; and FIG. 7 is a schematic view of a portion of an articulated vehicle forming an alternate embodiment of the invention.

Figure 2:
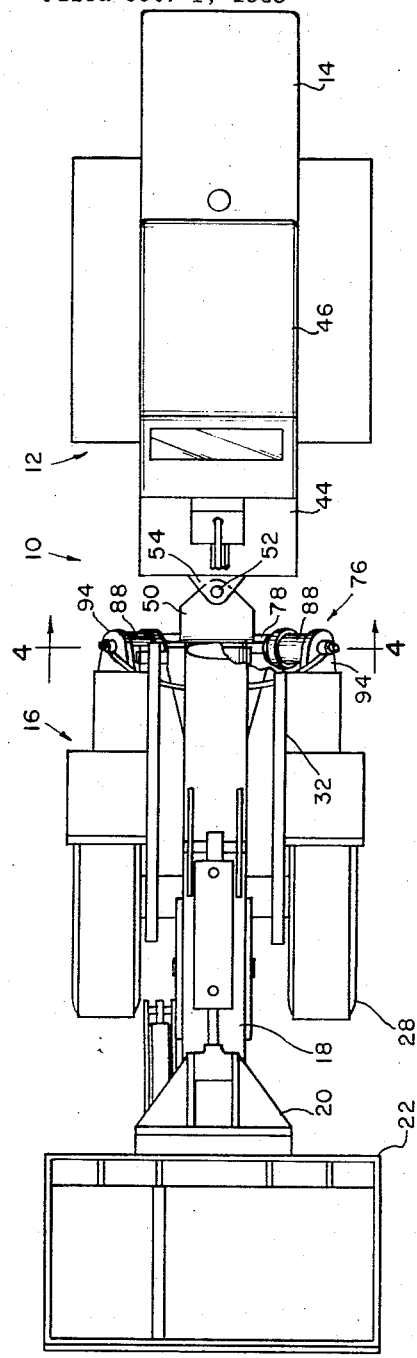
FIG. 2 is a top plan view of the vehicle of FIG. 1.
Figure 1:
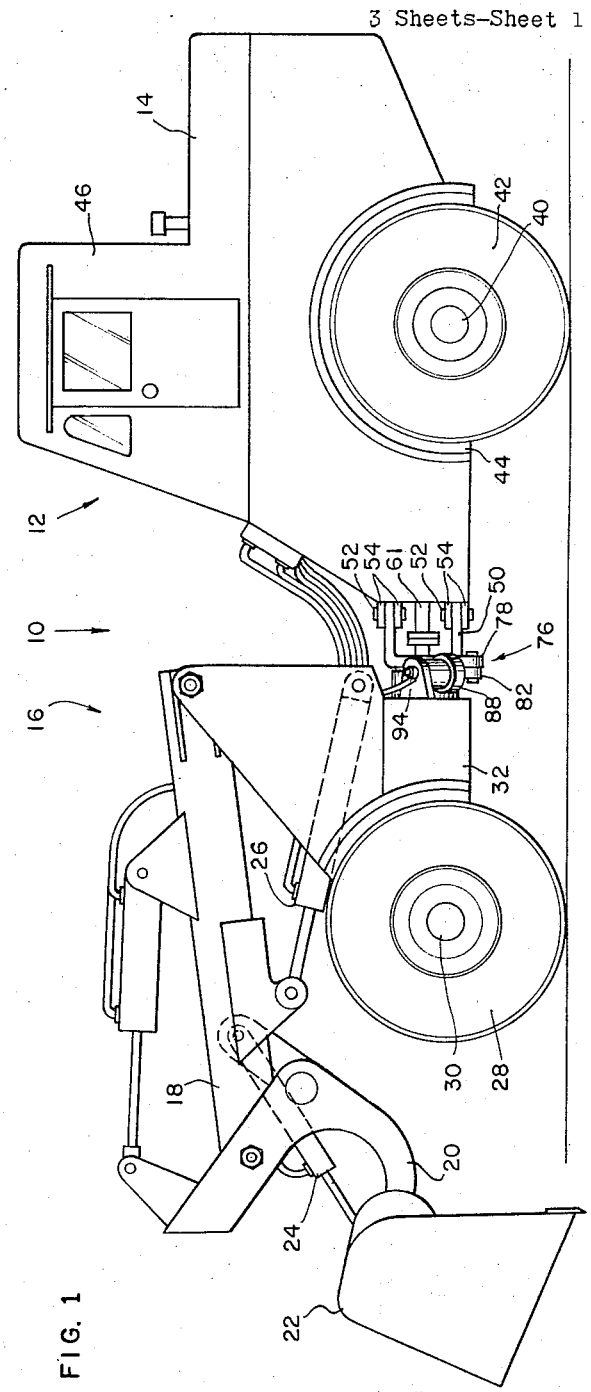
FIG. 1 is a side elevation view of an articulated vehicle forming one embodiment of the invention.

Referring now in detail to the drawings, there is shown in FIGS. 1 to 5 an articulated vehicle 10 forming a specific embodiment of the invention. The vehicle 10 is a front end loader generally like the front end loader disclosed in U.S. Patent 2,811,265 except as disclosed herein. The vehicle 10 includes a rear section 12 (FIGS. 1 and 2) having an engine (not shown) in a housing 14 and a front section 16 carrying a boom 18. The boom carries a bucket support 20, which supports pivotally a bucket 22 movable relative to the support by a hydraulic mechanism 24. A hoist cylinder 26 serves to raise and lower the boom 18, and the boom carries the bucket and any load therein in an outboard or extended position relative to a pair of wheels 28 mounted rotatably on an axle 30 fixed to frame 32 of the front section 16. An axle 40 carries a pair of wheels 42 and is supported by frame 44 of the rear section 12. A cab 46 is also supported by the frame 44.

A yoke 50 (FIGS. 1 to 3) is pivotal on pins 52 carried by brackets 54 fixed to the frame 44, whereby the yoke 50 is mounted pivotally relative to the frame 44 on a generally vertical pivot axis. The yoke 50 carries rigidly in a forwardly projecting position a sleeve 58 (FIG. 3), which is journaled in and held against thrust relative to a sleeve 60 fixed rigidly to the frame 32 of the front section 16. A drive shaft 61 having universal joints therein couples the engine to the wheels 28. The brackets 54, pins 52 and yoke 50 form a vertical pivot connection connecting the two frames 32 and 44 to permit the vehicle to be turned, which is accomplished by power steering including hydraulic cylinders and pistons extending between the front and rear sections 10 and 12. The sleeves 58 and 60 form a horizontal pivot connection. The sleeves 58 and 60 permit the frame 32 to pivot relative to the frame 44 about a horizontal pivot axis thereof extending longitudinally of the frame 32. This permitted pivoting about the horizontal pivot axis relative to each other causes all the wheels 28 and 42 to remain on the ground even if the ground is uneven.

The above-described vertical pivot connection is essential to turn the vehicle and the above-described horizontal pivot connection keeps all the wheels on the ground. However, when the section 16 is in a turned position relative to the rear section 12 and a maximum load is being lifted by the boom 18, the horizontal pivot connection, by permitting free horizontal pivoting movement between the two sections 12 and 16, would permit the forward one of the wheels 42 to be pressed against the ground and this wheel 42 would support a large portion, approximately one-half, of the weight of the rear section 42. This takes away a correspondingly large part of the counterbalancing effect of the weight of the section 12. To prevent this shifting of the large part of the weight of the section 12 to one of the wheels 42 in such conditions, there is provided a restraining device 76 (FIG. 4) for opposing pivotal movement between the sections 12 and 16 about the horizontal pivot axis with a force proportional to the load on the boom 18. The device 76 includes a rigid cross bar 78 fixed rigidly to the bottom of the yoke 50 and extending transversely thereacross. The cross bar has a recess 79 complementary to and closely receiving the lower portion of the yoke and is welded to the yoke. The cross bar has end portions 80 at the ends thereof spaced laterally and equidistantly from the centerline of the yoke 50, which centerline is the horizontal pivot axis of the two sections 12 and 16. The end portions 80 also project laterally beyond the sides of the yoke. End portions of piston rods 82 are secured pivotally to the end portions 80 by pins 84 and are carried by pistons 86 enclosed in cylinders 88 having tubular end pins 90 at the outer ends thereof. The pins 90 extend loosely through bores 92 in lugs 94 fixed rigidly to the frame 32 of the load carrying section 16 at opposite sides of the centerline of the yoke and normally both lugs are at the same level as the centerline of the yoke, as shown in FIG. 4. The cylinders 88 normally have therein hydraulic liquid under pressure on the upper ends of the pistons and extend generally upwardly and outwardly from the end portions 80 of the cross bar so that one or the other cylinder always opposes turning movement of the front section 16 on the horizontal pivot axis relative to the yoke 50. Hence, one of the pistons always opposes relative turning movement between the front and rear sections 12 and 16 relative to each other on the horizontal pivot axis.

Conduits 96 are connected by connectors 97 to hollow interior portions of the pins 90, which lead to the upper ends of the cylinders 88 and hydraulic liquid under pressure is supplied to the conduits 96 by means of a conduit 98, a three way valve 99 operable by a solenoid 101 under the control of the operator, a conduit 103, a manually operable shut off valve 100, a conduit 102, a four way valve 105, conduit 104 and pump 106 of the vehicle. The conduit 102 is connected to a conduit 108 connected to the lower end of hoist cylinder 26. The valve 105 controls the supply from the pump 106 selectively to the conduit 102 and a conduit 107 from the upper end of the cylinder 26. An exhaust conduit 109 connects the exhaust port of the valve 105 to the reservoir 111. The valve 99 may be set selectively by solenoid 101 under the control of the operator either in a condition connecting the conduit 98 to the conduit 103 in which the upper ends of the cylinders 88 are supplied with hydraulic liquid under the same pressure as that being supplied to the lower end of the hoist cylinder 26 or a condition in which the conduit 103 is closed off and the conduit 98 is connected to an exhaust conduit 109 in which latter condition the hydraulic liquid in the upper ends of the cylinders is under no pressure as may be desirable under certain conditions, such as, for example, when the vehicle is traveling with no load or only a light load. The valve 100 is normally open but may be closed off if it is desired to lock the sections 12 and 16 against any pivotal movement relative to each other about the horizontal pivot axis, the piston rods 82 being fully extended as illustrated in FIG. 4. The exhaust conduit 109 leads to a reservoir 111.

When the valve 100 is open and the valve 99 is set to connect the conduits 98 and 103, any relative pivotal movement between the sections 12 and 16 about the horizontal pivot axis of the section 32 is resisted by the restraining device 76 with a force proportional to the force of the load in the bucket 22 acting on the hoist cylinder 110. Hence, the counterweighting effect of the rear section 12 is much higher than it would be if there were substantialy free pivotal movement about the horizontal pivot axis. When the vehicle is level as shown in FIG. 4, the pistons 86 bottom against the lower ends of the cylinders. Hence, when there is turning movement between the sections 12 and 16 about the horizontal pivot axes, one of the cylinders 88 exerts no force tending to cause such turning movement as illustrated by the righthand cylinder 88 as viewed in FIG. 5 so that only the restraining force of the other cylinder is exerted by the device 76. However, when the wheels 28 and 42 are on uneven ground the frame 32 can pivot against the action of the restraining device about the horizontal pivot axis and move one of the cylinders 88 downwardly along piston rod 82 against the action of the hydraulic liquid therein, as illustrated by the lefthand cylinder 88 and piston 82 as viewed in FIG. 5, the righthand pin 90 of the righthand cylinder 88 merely sliding relative to the lug 94.

In FIG. 6 there is shown a portion of an articulated vehicle 10 and having a restraining device 132 substantially identical to the restraining device 76 (FIG. 4) but having restraining cylinders 134 thereof supplied with hydraulic liquid from a conduit 136 leading to an accumulator 138 having a dome portion 140 filled with air and maintaining hydraulic liquid 142 under substantially constant pressure. Otherwise, the device 132 is substantially identical with the device 76. A manually operable valve 143 is provided for manual closure of the supply line 136 by the operator when desired for heavy loads.

In FIG. 7 there is shown a portion of an articulated vehicle forming an alternate embodiment of the invention, and generally similar to the vehicle 10 and including a pivot structure 150 and a restraining device 152 generally like the restraining devices 76 and 132. The device 152 is supplied with air under pressure from a conduit 156 under the control of an adjustable pressure regulating valve 158 operable by the operator of the vehicle to supply air under a desired pressure to the upper ends of cylinders 160. The valve 158 is supplied with air under a predetermined pressure by conduit 159 leading to a source of air under pressure (not shown), and is of known construction having a diaphragm mechanism 161 serving to control the pressure of the air supplied to the conduit 156. The valve 158 is a bleeder type of valve and the rate of bleeding of the air determines the pressure of the air supplied to the conduit 156. The rate of bleeding of the valve is controlled by the setting of the diaphragm mechanism which, in turn, is controlled by a known actuating device 163 positioned in the cab of the vehicle and having a control knob 165 operable by the operator to set the diaphragm mechanism and also set a pointer 167 relative to an indicating scale 169, which may be calibrated in terms of load to be picked up by the vehicle.

The above-described articulated vehicles are very effectively counterbalanced and stabilized. Thus, they are much lighter in weight for maximum hoist loads than the articulated vehicles known hitherto. The vehicles maintain even load distribution on the tires, maintain stability, have excellent balance and all of the wheels thereof are kept on the ground with positive traction. Also, the horizontal pivoting movement of the two sections is permitted to the extent desired by the operator. For a given maximum load capacity, the above-described vehicles can be much lighter than has been possible hitherto with all the advantages concomitant with reduced weight, and also can have shorter wheel bases and shorter turning radii.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In an articulated vehicle,
a first frame,
wheels carrying the first frame,
a second frame,
wheel carrying the second frame,
vertical pivot means having a first member and a second member pivotal relative to the first member about only a generally vertically pivot axis,
the first member being fixed rigidly to the first frame,
horizontal pivot means connecting the second frame pivotally to the second member about a horizontal pivot axis extending longitudinally relative to the second frame,
outboard load means on one of the frames,
a first lug fixed to the second frame at one side of said horizontal pivot axis,
a first extensible hydraulic unit connected at one end to the second member and connected at the other end to the first lug at the other end of the unit,
a second lug fixed to the second frame at the side of the horizontal pivot axis opposite to that at which the first lug is positioned,
a second extensible hydraulic unit connected at one end to the second member and connected at the other end thereof to the second lug,
the hydraulic units having liquid therein tending to extend the hydraulic units with a sustained force so as to make the full weight of the other frame effective in accordance with the magnitude of said force in counterbalancing when the frames have been turned about the vertical pivot means to an angular relationship to each other,
and manually operable means for selectively varying the pressure of the liquid in the hydraulic units over a predetermined range.

2. The articulated vehicle of claim 1 wherein each extensible hydraulic unit includes means preventing movement thereof appreciably beyond a position in which the frames are centered relative to one another,
first lost motion connecting means connecting the first extensible hydraulic unit to the first lug and permitting travel of the first lug away from the first extensible hydraulic unit,
and second lost motion connecting means connecting the second extensible hydraulic unit to the second lug and permitting travel of the second lug away from the second extensible hydraulic unit.

3. In an articulated vehicle,
a first frame,
wheels on the first frame,
a second frame,
wheels on the second frame,
vertical pivot means having a first member and a second member pivotal relative to the first member about only a generally vertical axis,
the first member being fixed rigidly to the first frame,
a bearing fixed rigidly to the second frame in a position extending generally horizontally,
shaft means fixed rigidly to the second member of the vertical pivot means and mounted rotatably by the bearing,
a first extensible hydraulic unit connected at one end to the second member at one side of the shaft means and connected at the other end to the second frame at a point thereon such that the first hydraulic unit opposes turning movement of the second frame relative to the shaft means in one direction,
a second hydraulic unit connected at one end to the second member at the other side of the shaft means and connected at the other end thereof to the second frame at a point thereon such that the second hydraulic unit opposes turning movement of the second frame relative to the shaft means in the other direction,
load supporting means on one of the frames,
means responsive to the magnitude of a load carried by the load supporting means for varying the pressure of hydraulic liquid in the hydraulic units and sustaining the pressure of the liquid,
and manually adjustable means for adjusting the means responsive to a load to vary the pressure of the liquid in the hydraulic units over a predetermined range.

4. In a front end loader,
a rear frame,
rear wheels mounting the rear frame,
an engine on the rear frame for driving the rear wheels,
a front frame,
front wheels mounting the front frame,
load-carrying means on the front frame,
a yoke member pivotally connected to the forward end of the rear frame for pivotal movement about a vertical pivot axis relative to the rear frame and having a first sleeve projecting forwardly therefrom,
a second sleeve fixed at one end to the front frame and journaling the first sleeve,
a cross bar having pivot means at both ends thereof and secured at the central portion thereof to the yoke in a horizontal position extending transversely of the sleeves, a pair of stop lugs having bores therethrough secured to the front frame in spaced positions above the ends of the bar, a pair of piston members pivotally connected to the pivot means of the bar, a pair of cylinders slidable along the piston members and having fixed guide rods extending slidably through the bores in the lugs, and means for supplying hydraulic liquid under a sustained pressure to the cylinders to urge the cylinders toward engagement with the lugs so that the cylinders oppose turning movement of the front frame relative to the yoke with a sustained force.

5. In a front end loader, a rear frame, rear wheels mounting the rear frame, an engine on the rear frame for driving the rear wheels, a front frame, front wheels mounting the front frame, a boom on the front frame and projecting forwardly of the front wheels, hydraulic means for lifting the boom, a load carrying bucket on the boom and positioned forwardly of the front wheels, a yoke member pivotally connected to the forward end of the rear frame for pivotal movement about a vertical pivot axis relative to the rear frame and having a first sleeve projecting forwardly therefrom, a second sleeve fixed at one end to the front frame and journaling the first sleeve, a cross bar having pivot means at both ends thereof and secured at the central portion thereof to the yoke in a horizontal position extending transversely of the sleeves, a pair of stop lugs having bores therethrough secured to the front frame is spaced positions above the ends of the bar, a pair of piston members pivotally connected to the pivot means of the bar, a pair of cylinders slidable along the piston members and having fixed guide rods extending slidably through the bores in the lugs, and means for supplying hydraulic liquid under a sustained pressure to the hydraulic means and to the cylinders to urge the cylinders toward engagement with the lugs so that the cylinders oppose with a sustained force turning movement of the front frame relative to the yoke.

6. In an articulated vehicle, first axle means, a pair of wheels on the first axle means, a first frame member supported by the first axle means, second axle means, a pair of wheels on the second axle means, a second frame member supported by the second axle means, means connecting the frame members and axle means for pivotal movement of the first axle means and the first frame member relative to the second axle means, and the second frame member about a vertical axis and for relative pivotal movement between the axle means about a horizontal axis extending perpendicularly to one of the axle means, outboard load-carrying means carried by one of the frame members, variable means for yieldably restraining with a sustained force said relative pivotal movement about said horizontal axis, so as to make the full weight of the other frame member effective in accordance with the magnitude of said force in counterbalancing when the frame members have been turned about said vertical axis to an angular relationship to each other, and manually operable means for adjusting the variable means to vary the effective force of the variable means over a predetermined range.

7. In an articulated vehicle, a first wheeled section having a pair of laterally spaced wheels, a second wheeled section having a pair of laterally spaced wheels, vertical pivot means connected to the first wheeled section to permit pivotal movement of the first wheeled section only about a substantially vertical axis, horizontal pivot means connecting the second wheeled section to the vertical pivot means to permit limited pivotal movement only about a horizontal pivot axis of the second wheeled section relative to the vertical pivot means, outboard load means on one of the sections, coupling means interconnecting the first and second wheeled sections for resisting such pivotal movement about the horizontal axis with a sustained force so as to make the full weight of the other section effective in accordance with the magnitude of said force in counterbalancing when the sections have been turned about the vertical pivot means to an angular relationship to each other, and selectively operable means for varying the force of resistance of the coupling means over a predetermined range.

8. In an articulated vehicle, a first frame, wheels on the first frame, a second frame, wheels on the second frame, vertical pivot means having a first member and a second member pivotal relative to the first member about only a generally vertical axis, the first member being fixed rigidly to the first frame, a bearing fixed rigidly to the second frame in a position extending generally horizontally, shaft means fixed rigidly to the second member of the vertical pivot means and mounted rotatably by the bearing, a first single-acting extensible hydraulic unit, means connecting one end of the first extensible hydraulic unit to the second member at one side of the shaft means, means connecting the other end of the first extensible hydraulic unit to the second frame at a point thereon such that the first extensible hydraulic unit opposes turning movement of the second frame relative to the shaft means in one direction only from a substantially centered position of the second frame relative to the first frame, a second single-acting extensible hydraulic unit, means connecting one end of the second extensible hydraulic unit to the second member at the other side of the shaft means, means connecting the other end of the second extensible hydraulic unit to the second frame at a point thereon such that the second extensible hydraulic unit opposes turning movement of the second frame relative to the shaft means in the other direction only from a substantially centered position of the second frame relative to the first frame, each of the extensible units being extensible only to a position centering the first and second frames, load supporting means on one of the frames, and means responsive to the magnitude of a load carried by the load supporting means for varying the pressure of hydraulic liquid in the hydraulic units and sustaining the pressure of the liquid.

9. In a front end loader, a rear frame,
rear wheels mounting the rear frame,
an engine on the rear frame for driving the rear wheels,
a front frame,
front wheels mounting the front frame,
load-carrying means on the front frame,
a yoke member pivotally connected to the forward end of the rear frame for pivotal movement about a vertical pivot axis relative to the rear frame and having a first sleeve projecting forwardly therefrom,
a second sleeve fixed at one end to the front frame and journaling the first sleeve,
a cross bar having pivot means at both ends thereof and secured at the central portion thereof to the yoke in a horizontal position extending transversely of the sleeves,
a pair of stop lugs having bores therethrough secured to the front frame in spaced positions above the ends of the bar,
a pair of piston members pivotally connected to the pivot means of the bar,
a pair of cylinders slidable along the piston members and having fixed guide rods extending slidably through the bores in the lugs,
each piston and cylinder being extensible to an extent not greater than that in which the frames are substantially centered relative to each other,
and means for supplying hydraulic liquid under a sustained pressure to the cylinders to urge the cylinders toward engagement with the lugs so that the cylinders oppose turning movement of the front frame relative to the yoke with a sustained force, 10. In a front end loader,
a rear frame,
rear wheels mounting the rear frame,
an engine on the rear frame for driving the rear wheels,
a front frame,
front wheels mounting the front frame,
a boom on the front frame and projecting forwardly of the front wheels,
a load carrying bucket on the boom and positioned forwardly of the front wheels,
hydraulic means for lifting the boom,
a yoke member pivotally connected to the forward end of the rear frame for pivotal movement about a vertical pivot axis relative to the rear frame and having a first sleeve projecting forwardly therefrom
a second sleeve fixed at one end to the front frame and journaling the first sleeve,
a cross bar having pivot means at both ends thereof and secured at the central portion thereof to the yoke in a horizontal position extending transversely of the sleeves,
a pair of stop lugs having bores therethrough secured to the front frame in spaced positions above the ends of the bar,
a pair of piston members pivotally connected to the pivot means of the bar,
a pair of cylinders slidable along the piston members and having fixed guide rods extending slidably through the bores in the lugs and each cylinder being extensible relative to the piston along which it is slidable to an extent such that the last-mentioned cylinder will not push the front frame substantially beyond a position thereof centered relative to the rear frame,
and means for supplying hydraulic liquid under a sustained pressure to the hydraulic means and to the cylinders to urge the cylinders toward engagement with the lugs so that the cylinders oppose with a sustained force turning movement of the front frame relative to the yoke.

References Cited
UNITED STATES PATENTS

| | | | |
|---|---|---|---|
| 2,663,266 | 12/1953 | Baldwin | 280—111 |
| 2,811,265 | 10/1957 | Wagner | 214—140 |
| 2,835,397 | 5/1958 | Wagner | 214—140 |
| 2,914,202 | 11/1959 | Wagner | 214—140 |
| 2,941,612 | 6/1960 | Bernotas | 180—51 |
| 3,049,186 | 8/1962 | Garrett | 180—51 |
| 3,059,792 | 10/1962 | Bernotas | 214—140 |

HUGO O. SCHULZ, *Primary Examiner.*